Feb. 6, 1934.  D. L. CRAMP  1,946,062
CLUTCH MECHANISM
Filed July 12, 1929
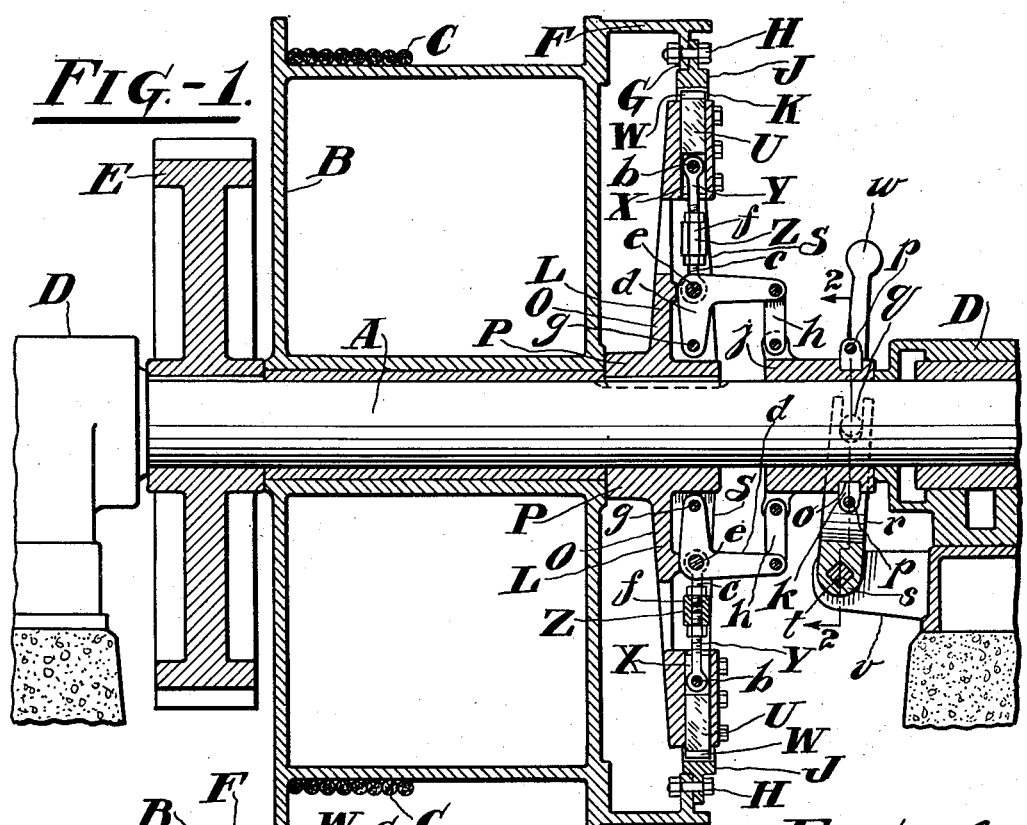
INVENTOR.
David L. Cramp.
BY
HIS ATTORNEY.

Patented Feb. 6, 1934

1,946,062

UNITED STATES PATENT OFFICE 1,946,062

CLUTCH MECHANISM

David L. Cramp, Kirkland Lake, Ontario, Canada, assignor to Ingersoll-Rand Company, Jersey City, N. J., a corporation of New Jersey Application July 12, 1929. Serial No. 377,716

2 Claims. (Cl. 192—71)

This invention relates to clutch mechanism of the type used for forming a connection between a driving member and a driven member.

The primary object of the invention is to form a positive connection between the driving member and the member intended to be driven, and another object is to enable this connection to be made with a minimum degree of exertion on the part of the operator.

Other objects will be in part obvious and in part pointed out hereinafter.

In the drawing illustrating a practical application of the invention and in which similar reference characters refer to similar parts, Figure 1 is a longitudinal sectional elevation of a hoist having the invention applied thereto, Figure 2 is a transverse view through Figure 1 taken on the line 2—2 looking in the direction indicated by the arrows, Figure 3 is a view similar to Figure 1 showing the clutch member disengaged, and Figure 4 is a sectional elevation of a modification of the invention.

Referring to the drawing, the invention is shown applied to a hoisting mechanism comprising a drive shaft A on which is loosely mounted a drum B carrying a cable C. The driving shaft A in this instance is shown journalled in bearings D on opposite sides of the drum and between one bearing D and the drum is a gear E which may be suitably keyed to the drive shaft A and through which the rotary movement of a prime mover (not shown) may be transmitted to the drive shaft A.

In accordance with the present invention, means are provided for positively connecting the drum B with the drive shaft A. To this end the drum B is provided with an annular flange F having an internal radial flange G to which is secured, as by means of bolts H, a ring J having on its inner periphery a series of introverted radially arranged V-shape teeth K.

On one side of the drum B and in approximately the same transverse plane as the ring J is a driving member L comprising in this instance a pair of half disks O having central hub portions P to snugly fit the drive shaft A. On the contiguous portions of the half disks O are lateral flanges Q which lie face to face and through which extend bolts R for securing the half disks O firmly together and to the drive shaft A.

The disks O are shown provided with radially extending ribs S which may extend in opposite directions on the disks in pairs and are so spaced with respect to each other as to form a guideway T therebetween to slidably receive a block U. The block U may be of generally rectangular shape having at its outermost end a series of V-shape teeth W of substantially the same shape as the teeth K which they are adapted to engage.

In the innermost end of the block U is a longitudinal slot X into which extends an arm Y of a turn-buckle Z. The arm Y is pivoted at its free end on a pin b seated in the block U. The opposite arm c of the turn-buckle Z is pivoted to a bell crank d by means of a pin e. The arms Y and c may be provided with threads running in opposite directions in the usual manner to enable said arms to be drawn together or extended by means of the nut f whereby the arms are connected.

In the construction shown, the pivot pin e extends through the angle of the bell crank d. One end of the bell crank d is pivotally secured to the disk O by means of a pivot pin g and the other arm of the bell crank is pivotally connected to a link h which is pivoted at its other end to a sleeve j loosely mounted on the drive shaft A. The entire arrangement is such that the sleeve j will at all times follow the movement of the disks O.

Means are provided for manually actuating the sleeve j to move the block or blocks U into and out of engagement with the ring J. To this end a clutch collar comprising a pair of symmetrical half sections k is disposed loosely in a groove o in the sleeve j so that the sleeve j may rotate freely while the clutch collar for which the sleeve forms a bearing may remain stationary. The half sections k may be suitably clamped together by means of bolts p and each half section k carries a trunnion q which, when the sections k are in their assembled relationship, lie diametrically opposite each other.

Pivoted on the trunnions q is a yoke r having a hub s in which is formed an aperture t preferably of polygonal cross sectional form to receive and interlockingly engage a correspondingly shaped shaft u journalled in bearings v connected in this instance to a bearing D. One end of the shaft u projects beyond a bearing v and carries a lever w whereby the shaft u may be oscillated to actuate the sleeve j longitudinally of the drive shaft A.

The operation of the device so far described is as follows: Let it be assumed that the drive shaft A is being rotated and that the clutch mechanism is in its disengaged position so that the drum B remains stationary with respect to the shaft A. If then it be desired to connect the drum B to be rotated with the shaft, the sleeve $j$ may be moved in the direction of the bearing D adjacent thereto as illustrated in Figure 1. This movement of the sleeve $j$ will cause the link $h$ to raise the bell crank $d$ and thus, through the medium of the turn-buckle Z, move the block U outwardly so that its teeth W will engage the teeth K of the ring J. The ring J and consequently the drum B will then be in positive engagement with the drive shaft A through the block U and the half disks O. When it is again desired to maintain the drum stationary, the sleeve $j$ may be moved in the direction of the drum by means of the lever $w$ and this will cause the connections between the sleeve $j$ and the block U to retract the block and move its teeth W out of engagement with the teeth K on the ring J.

From the foregoing it will be observed that by means of the mechanism described a positive engagement may be effected between a driving member and a driven member and that these members may be brought into engagement with only a slight movement of the means whereby they are actuated. Moreover, this arrangement entirely eliminates the transmission of end thrust from one member to the other while bringing the members into engagement or when they are engaged. One advantageous feature of the clutch is that whenever teeth of the various parts comprising the clutch are not in exact alignment for immediate tight engagement, the blocks U may nevertheless be thrust radially outward and only a very small degree of movement of the drive shaft A will be required until the teeth of the block U will move tightly into the serrations between the teeth K of the ring J. If, in the event that wear takes place on the teeth, and in which case a loose connection between the teeth would otherwise result, the turn-buckle Z may be slightly adjusted to compensate for such wear.

The modified form of construction illustrated in Figure 4 is in many respects similar to that previously described. In this instance, however, the link $h$ is connected to the arm $c$ of the turn-buckle and a second link $x$ is likewise pivoted at one end of the arm $c$ of the turn-buckle Z and with its other end to the half disk O. Due to this arrangement a toggle action is obtained so that when the sleeve $j$ is moved longitudinally of the shaft A and in the direction of the drum B, the adjacent ends of the turn-buckle Z and the link $x$ will be moved in the direction of the plane in which the outer ends of the link $x$ and the turn-buckle Z are pivoted. This movement of these members will cause the block U to be moved outwardly into engagement with the ring J.

I claim:

1. A clutch, comprising a drive shaft, a drum rotatably mounted thereon, a ring gear having introverted teeth, means for securing the ring gear to the drum, a driving member affixed to the drive shaft and rotatable therewith, guide means on the driving member, blocks in the guide means having teeth adapted to engage the teeth of the ring gear, means surrounding the drive shaft and slidable therealong connected to the toothed blocks, and means to actuate the last mentioned means along the shaft to cause the toothed blocks to engage the ring gear thereby causing motion of the drive shaft to be transmitted to the drum.

2. A clutch, comprising a drive shaft, a drum rotatably mounted thereon, a ring gear having introverted teeth, bolts for securing the ring gear to the drum, a driving member affixed to the drive shaft and rotatable therewith, guide means on the driving member, blocks in the guide means having teeth adapted to engage the teeth of the ring gear, a collar surrounding the drive shaft and slidable therealong connected to the toothed blocks, and means to actuate the collar along the shaft to cause the toothed blocks to engage the ring gear thereby causing motion of the drive shaft to be transmitted to the drum.

DAVID L. CRAMP.